(12) United States Patent
Momose

(10) Patent No.: US 12,541,333 B2
(45) Date of Patent: Feb. 3, 2026

(54) PRINTING APPARATUS, NON-TRANSITORY COMPUTER-READABLE STORAGE MEDIUM STORING PRINT DATA GENERATION PROGRAM FOR GENERATING SUB-JOBS

(71) Applicant: SEIKO EPSON CORPORATION, Tokyo (JP)

(72) Inventor: Yasuhiro Momose, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 208 days.

(21) Appl. No.: 18/414,018

(22) Filed: Jan. 16, 2024

(65) Prior Publication Data

US 2024/0241680 A1   Jul. 18, 2024

(30) Foreign Application Priority Data

Jan. 17, 2023 (JP) .................................. 2023-005241

(51) Int. Cl.
  *G06F 3/12*   (2006.01)

(52) U.S. Cl.
  CPC .......... *G06F 3/1262* (2013.01); *G06F 3/1204* (2013.01); *G06F 3/1208* (2013.01); *G06F 3/1253* (2013.01)

(58) Field of Classification Search
  CPC .... G06F 3/1262; G06F 3/1204; G06F 3/1208; G06F 3/1253; H04N 1/00482
  See application file for complete search history.

(56) References Cited

U.S. PATENT DOCUMENTS

| | | | | |
|---|---|---|---|---|
| 2004/0027594 A1* | 2/2004 | Suzuki | ..................... | G06T 5/94 358/1.9 |
| 2007/0229881 A1* | 10/2007 | Matsubara | ............ | G06F 3/1288 358/1.9 |
| 2008/0304102 A1* | 12/2008 | Saito | ..................... | G06F 3/1207 358/1.15 |
| 2010/0225938 A1* | 9/2010 | Nara | ....................... | H04N 1/62 358/1.9 |
| 2010/0328703 A1* | 12/2010 | Cain | ..................... | G06F 3/1241 358/1.15 |
| 2011/0158727 A1* | 6/2011 | Yamakawa | .......... | G06K 15/404 399/407 |

(Continued)

FOREIGN PATENT DOCUMENTS

| | | |
|---|---|---|
| JP | 2008-090721 A | 4/2008 |
| JP | 2009-065532 A | 3/2009 |

*Primary Examiner* — Nicholas Pachol
(74) *Attorney, Agent, or Firm* — WORKMAN NYDEGGER

(57) ABSTRACT

A printing control unit of a printing apparatus is accepting input of information related to the number of copies of a printed matter according to a first printing condition and the number of copies of a printed matter according to a second printing condition in each of the plurality of sub-groups, and storing the information, and the printing control unit performs printing based on the first printing condition based on the number of copies of the printed matter according to the first printing condition set for each of a plurality of sub-groups included in the main group, and causes printing to be performed based on the second printing condition based on the number of copies of the printed matter according to the second printing condition set for each of the plurality of sub-groups included in the main group.

7 Claims, 14 Drawing Sheets

(56) References Cited

U.S. PATENT DOCUMENTS

| | | | |
|---|---|---|---|
| 2012/0002219 A1* | 1/2012 | Komine | H04N 1/46 358/1.9 |
| 2012/0081720 A1* | 4/2012 | Pandit | G06F 3/1219 358/1.9 |
| 2012/0307301 A1* | 12/2012 | Otomaru | G03G 15/502 358/1.15 |
| 2016/0246556 A1* | 8/2016 | Rajalingam | G06F 3/1253 |
| 2016/0253130 A1* | 9/2016 | Rajalingam | G06F 3/1288 358/1.15 |
| 2018/0232184 A1* | 8/2018 | Iacob | G06F 3/1263 |
| 2019/0279402 A1* | 9/2019 | Panetta | G06T 7/10 |
| 2019/0289149 A1* | 9/2019 | Iwamoto | G06F 3/1285 |
| 2020/0105171 A1* | 4/2020 | Greenebaum | G06T 5/80 |
| 2020/0310727 A1* | 10/2020 | Hebbar | H04N 1/32085 |
| 2021/0337086 A1* | 10/2021 | Kim | G06F 3/1208 |
| 2022/0179597 A1* | 6/2022 | Yoon | G06F 3/1285 |

\* cited by examiner

PRINTING APPARATUS, NON-TRANSITORY COMPUTER-READABLE STORAGE MEDIUM STORING PRINT DATA GENERATION PROGRAM FOR GENERATING SUB-JOBS

The present application is based on, and claims priority from JP Application Serial Number 2023-005241, filed Jan. 17, 2023, the disclosure of which is hereby incorporated by reference herein in its entirety.

BACKGROUND

1. Technical Field

The present disclosure relates to a printing apparatus that performs printing. Further, the present disclosure also relates to a non-transitory computer-readable storage medium storing a print data generation program.

2. Related Art

JP 2008-090721 A discloses a printing system that makes it possible to print printed matters for all members of a group with image quality and a breakdown of the number of copies corresponding to classification of the members of the group by one print instruction.

To be more specific, in JP 2008-090721 A, the above printing system is installed in a teacher's room of a school, and is used by a teacher in charge of a certain grade or class to print printed matters for distribution to students of the grade or class. In operation of the printing system, when color handouts are printed for distribution, the teacher checks the number of colorblind people among students of the grade or class that the teacher is in charge of for each degree of colorblindness, and registers distribution destination information including information about the number of people for each degree of colorblindness with a host terminal in advance.

Then, for example, when a teacher of Class A of a first grade prints color handouts, the teacher performs a print instruction operation for specifying the number of copies for the number of people of Class A as the total number of copies to be printed, and for specifying Class A as a distribution target on a print setting screen provided by the above printing system. Then, the printing system determines that the distribution target is Class A, and based on information stored corresponding to Class A, that is, a degree of colorblind people and the number of people corresponding thereto, outputs appropriate number of copies of each of a color handout for colorblind people and a color handout for non-colorblind people while performing drawing image conversion processing corresponding to each degree of colorblind people. Note that the number of copies of the color handout for the non-colorblind people is obtained by subtracting the number of registered colorblind people from the specified total number of copies to be printed.

In the example of JP 2008-090721 A, the teacher of Class A of the first grated prints the color handouts for Class A that the teacher is in charge of, thus the teacher naturally grasps the number of people of entire Class A, that is, the total number of copies to be printed, and can easily specify the total number of copies to be printed on the print setting screen.

However, for example, when another teacher tries to output the color handouts for Class A, there is a case where the teacher does not accurately grasp the number of people of entire Class A, and it is necessary for the teacher to check the accurate number of people of entire Class A and then input the total number of copies to be printed on the print setting screen, which is inconvenient. In addition, for example, when color handouts are further printed for distribution to other classes of the first grade, it is necessary to accurately grasp the number of people of each class, and it is necessary to perform a similar printing operation for each class after that, which takes time and labor.

SUMMARY

A printing apparatus of the present disclosure for solving the above-described problems is a printing apparatus including a printing section that performs printing on a medium, that includes an operation unit including a display unit that displays various information and configured to accept various operation settings, and a printing control unit configured to control the printing section based on a printing condition acquired via the operation unit, wherein the printing control unit is configured to display a plurality of main groups and a plurality of sub-groups belonging to one of the main groups on the display unit, the printing control unit is additionally configured to accept input of information related to the number of copies of a printed matter according to a first printing condition and the number of copies of a printed matter according to a second printing condition in each of a plurality of the sub-groups, and store the information, and the printing control unit, when receiving a print execution command after one main group is selected from among a plurality of the main groups, performs printing based on the first printing condition based on the number of copies of the printed matter according to the first printing condition set for each of a plurality of the sub-groups included in the main group, and performs printing based on the second printing condition based on the number of copies of the printed matter according to the second printing condition set for each of a plurality of the sub-groups included in the main group, in one print job.

Additionally, a print data generation program of the present disclosure is a print data generation program that generates print data based on an acquired printing condition, the print data generation program being configured to cause a computer to perform displaying a plurality of main groups on a display unit, displaying, when one main group is selected from among the plurality of main groups, a plurality of sub-groups belonging to the main group on the display unit, accepting input of information related to the number of copies of a printed matter according to a first printing condition and the number of copies of a printed matter according to a second printing condition in each of a plurality of the sub-groups, and storing the information, and when a print execution command is received after one main group is selected from among a plurality of the main groups, performing printing based on the first printing condition based on the number of copies of the printed matter according to the first printing condition set for each of a plurality of the sub-groups included in the main group, and performing printing based on the second printing condition based on the number of copies of the printed matter according to the second printing condition set for each of a plurality of the sub-groups included in the main group, in one print job.

DESCRIPTION OF EMBODIMENTS

Figure 1:
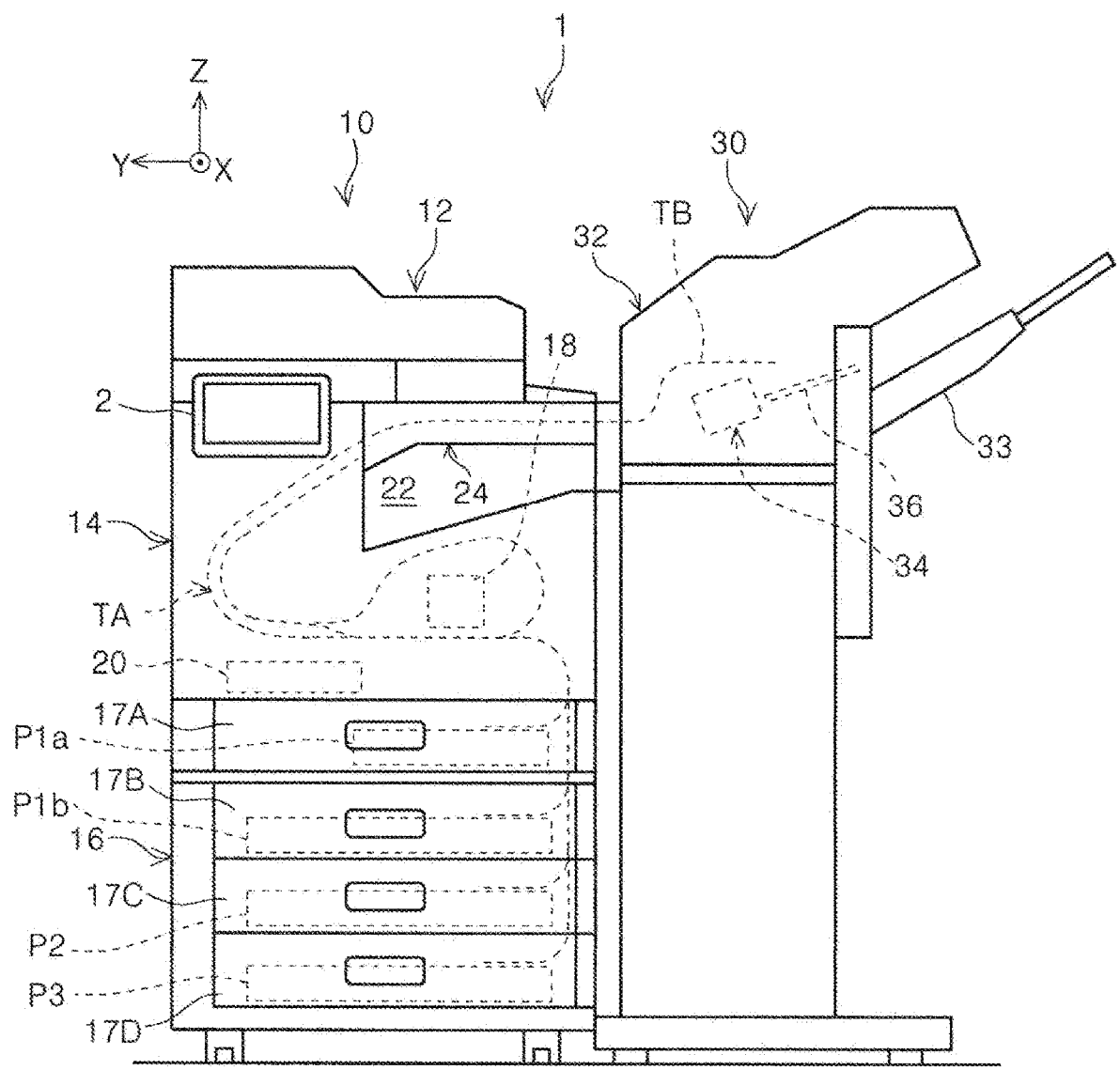
FIG. 1 is a front view of a printing apparatus.

Hereinafter, the present disclosure will be schematically described.

A printing apparatus according to a first aspect is a printing apparatus including a printing section that performs printing on a medium, that includes an operation unit including a display unit that displays various information and configured to accept various operation settings, and a printing control unit configured to control the printing section based on a printing condition acquired via the operation unit, wherein the printing control unit is configured to display a plurality of main groups and a plurality of sub-groups belonging to one of the main groups on the display unit, the printing control unit is additionally configured to accept input of information related to the number of copies of a printed matter according to a first printing condition and the number of copies of a printed matter according to a second printing condition in each of a plurality of the sub-groups, and store the information, and the printing control unit, when receiving a print execution command after one main group is selected from among a plurality of the main groups, performs printing based on the first printing condition based on the number of copies of the printed matter according to the first printing condition set for each of a plurality of the sub-groups included in the main group, and performs printing based on the second printing condition based on the number of copies of the printed matter according to the second printing condition set for each of a plurality of the sub-groups included in the main group, in one print job.

According to the aspect, a user can set the number of copies of a printed matter according to a first printing condition and the number of copies of a printed matter according to a second printing condition in each of a plurality of sub-groups belonging to one main group. Then, when the one main group is selected and printing is performed, the required number of copies of the printed matter according to the first printing condition are printed based on the first printing condition, and the required number of copies of the printed matter according to the second printing condition are printed based on the second printing condition, thus the user can perform printing even without knowing the required number of copies of the printed matter according to the first printing condition and the required number of copies of the printed matter according to the second printing condition in each of the plurality of sub-groups, and usability is improved dramatically.

Further, the plurality of sub-groups can be registered for the one main group, thus the printed matters belonging to the plurality of sub-groups are printed only by specifying the one main group, and the usability is further improved.

A second aspect is an aspect dependent on the first aspect, wherein the printed matter according to the first printing condition is a printed matter for non-colorblind people, the first printing condition includes a color setting for the non-colorblind people, the printed matter according to the second printing condition is a printed matter for colorblind people, and the second printing condition includes a color setting for the colorblind people.

According to the aspect, when the one main group is selected and printing is performed, the required number of copies of the printed matter for the non-colorblind people are printed according to the color setting for the non-colorblind people, and the required number of copies of the printed matter for the colorblind people are printed according to the color setting for the colorblind people, thus the user can perform printing even without knowing the number of non-colorblind people and the number of colorblind people in each of the plurality of sub-groups, and the usability is improved dramatically.

A third aspect is an aspect dependent on the second aspect, wherein the printing control unit accepts the number of copies of the printed matter for the colorblind people belonging to one of the sub-groups for each of different color settings, and additionally the printing control unit prints the specified number of copies for each of the different color settings when printing the printed matter for the colorblind people.

According to the aspect, the printing control unit accepts the number of copies of the printed matter for the colorblind people belonging to one of the sub-groups for each of different color settings, and additionally the printing control unit prints the specified number of copies for each of the different color settings when printing the printed matter for the colorblind people, thus can support a plurality of colorblind people having different color vision characteristics.

A fourth aspect is an aspect dependent on the second aspect, and includes a first media cassette configured to accommodate a medium with a short side direction along a feeding direction, and a second media cassette configured to accommodate a medium with a long side direction along the feeding direction, wherein the printing control unit is configured to perform a print mode in which the medium is fed from the first media cassette when the printed matter for the non-colorblind people is printed according to the color setting for the non-colorblind people, and the medium is fed from the second media cassette when the printed matter corresponding to the colorblind people is printed according to the color setting for the colorblind people.

According to the aspect, since the directions of the short side and the long side of the medium are switched between the printed matter corresponding to the non-colorblind people and the printed matter corresponding to the colorblind people, it is possible to easily distinguish the printed matter for the non-colorblind people and the printed matter for the colorblind people.

In addition, in many cases, since the number of copies of the printed matter corresponding to the non-colorblind people is greater than the number of copies of the printed matter corresponding to the colorblind people, and the printed matter corresponding to the non-colorblind people is fed with the short side direction along the feeding direction, it is possible to suppress a printing throughput.

Note that the aspect may also be dependent on the above third aspect, not only on the above second aspect.

A fifth aspect is an aspect dependent on the second aspect, further including a media cassette configured to accommodate a first interleaving sheet in addition to a media cassette that accommodates the medium, wherein the printing control unit is configured to perform a print mode in which the first interleaving sheet is interposed between the printed matter for the non-colorblind people and the printed matter for the colorblind people.

According to the aspect, since the printing control unit can perform the print mode in which the first interleaving sheet is interposed between the printed matter for the non-colorblind people and the printed matter for the colorblind people, visibility of where the printed matter for the colorblind people is located is improved.

Note that the aspect may also be dependent on the above third or fourth aspect, not only on the above second aspect.

A sixth aspect is an aspect dependent on the fifth aspect, further including a media cassette configured to accommodate a second interleaving sheet different from the first interleaving sheet, wherein the printing control unit is configured to perform a print mode in which the second interleaving sheet is interposed between printed matters of the sub-groups different from each other.

According to the aspect, since the printing control unit can perform the print mode in which the second interleaving sheet is interposed between the printed matters of the different sub-groups, visibility of a boundary between the printed matters of the different sub-groups is improved.

A print data generation program according to a seventh aspect is a print data generation program that generates print data based on an acquired printing condition, the print data generation program being configured to cause a computer to perform displaying a plurality of main groups on a display unit, displaying, when one main group is selected from among the plurality of main groups, a plurality of sub-groups belonging to the main group on the display unit, accepting input of information related to the number of copies of a printed matter according to a first printing condition and the number of copies of a printed matter according to a second printing condition in each of a plurality of the sub-groups, and storing the information, and when a print execution command is received after one main group is selected from among a plurality of the main groups, performing printing based on the first printing condition based on the number of copies of the printed matter according to the first printing condition set for each of a plurality of the sub-groups included in the main group, and performing printing based on the second printing condition based on the number of copies of the printed matter according to the second printing condition set for each of a plurality of the sub-groups included in the main group, in one print job.

According to the aspect, a user can set the number of copies of a printed matter according to a first printing condition and the number of copies of a printed matter according to a second printing condition in each of a plurality of sub-groups belonging to one main group. Then, when the one main group is selected and printing is performed, the required number of copies of the printed matter according to the first printing condition are printed based on the first printing condition, and the required number of copies of the printed matter according to the second printing condition are printed based on the second printing condition, thus the user can perform printing even without knowing the required number of copies of the printed matter according to the first printing condition and the required number of copies of the printed matter according to the second printing condition in each of the plurality of sub-groups, and usability is improved dramatically.

Further, the plurality of sub-groups can be registered for the one main group, thus the printed matters belonging to the plurality of sub-groups are printed only by specifying the one main group, and the usability is further improved.

Hereinafter, the present disclosure will be specifically described.

Hereinafter, a printing apparatus 1 according to an embodiment of the present disclosure will be described.

In each of the drawings, an X-axis direction is an apparatus depth direction of the printing apparatus 1. A +X direction of the X-axis direction, which is a direction in which an arrow faces, is a direction from an apparatus rear surface toward an apparatus front surface, and a −X direction is a direction from the apparatus front surface toward the apparatus rear surface. Additionally, the X-axis direction is an example of a width direction of a medium.

A Y-axis direction is an apparatus width direction of the printing apparatus 1, a +Y direction of the Y-axis direction, which is a direction in which an arrow faces is a left direction when viewed from a user facing the apparatus front surface, and a −Y direction is a right direction.

A Z-axis direction is an apparatus height direction of the printing apparatus 1, and is a vertical direction, a +Z direction, which is a direction in which an arrow faces, is a vertically upward direction, and a −Z direction is a vertically downward direction. In the following description, the +Z direction may be simply referred to as an upward direction and the −Z direction may be simply referred to as a downward direction.

Note that in an example described below, a case will be described in which the printing apparatus 1 is installed in a teacher's room of a school, and is used to print printed matters for distribution to students by school staff including a teacher, but it is needless to say that the application of the printing apparatus 1 is not limited thereto.

As illustrated in FIG. 1, the printing apparatus 1 includes a printing unit 10 and a post-processing unit 30. The printing unit 10 according to the embodiment is an ink jet printer that performs printing (recording) by discharging ink, which is an example of liquid, onto a medium represented by a printing sheet, and includes a line head 18, which is an example of a printing section. Further, the printing unit 10 is a so-called multifunction peripheral including a scanner unit 12 at an upper portion of the apparatus, and a copy function, a scanner function, a facsimile function, and the like are achieved by using the scanner unit 12. In particular, when the copy function is achieved in the printing apparatus 1, printing operation by the printing unit 10 is accompanied. However, the printing unit 10 is not limited to the ink jet printer, and may be configured to perform printing by another method, such as a laser printer, a thermal transfer printer, or a dot impact printer.

The printing unit 10 includes a main body unit 14, a media accommodation unit 16 that accommodates a medium, a medium transport unit (not illustrated) that transports the medium, the line head 18, an in-body discharge unit 22 to which the medium is discharged, a relay unit 24 that transports the medium to the post-processing unit 30, a printing control unit 20 that controls the entire printing apparatus 1, and an operation panel 2 as an operation unit that accepts various setting operations and displays various information.

The media accommodation unit 16 includes a first media accommodation cassette 17A, a second media accommodation cassette 17B, a third media accommodation cassette 17C, and a fourth media accommodation cassette 17D in this order from above.

The first media accommodation cassette 17A accommodates a first medium P1a. The first medium P1a is, as an example, a sheet of A4 size, and is accommodated with a short side direction along the feeding direction.

The second media accommodation cassette 17B accommodates a first medium P1b. The first medium P1b is, as an example, a sheet of A4 size, and is accommodated with a long side direction along the feeding direction.

The third media accommodation cassette 17C accommodates a second medium P2. The second medium P2 is, as an example, a sheet of A4 size, and is accommodated with a long side direction along the feeding direction. In addition, the second medium P2 is, as an example, a medium with a type different from that of the first medium P1b, in particular, is different in color from the first medium P1b, and can function to indicate a boundary between printed matters when interposed between the printed matters. That is, the second medium P2 is an interleaving sheet. The second medium P2 is an example of a first interleaving sheet.

The fourth media accommodation cassette 17D accommodates a third medium P3. The third medium P3 is, as an example, a sheet of A4 size, and is accommodated with a long side direction along the feeding direction. In addition, the third medium P3 is, as an example, a medium with a type different from the first medium P1b and the second medium P2, and in particular, is different in color from both the first medium P1b and the second medium P2, and can function to indicate a boundary between printed matters when interposed between the printed matters. That is, the third medium P3 is an interleaving sheet. The third medium P3 is an example of a second interleaving sheet. Note that it is needless to say that the second medium P2 and the third medium P3 need not be accommodated when unnecessary.

A transport path TA through which a medium fed from each medium accommodation cassette is transported is provided inside the main body unit 14.

The line head 18 includes a plurality of ink discharge nozzles (not illustrated) arranged corresponding to an entire region of the medium in the X-axis direction. The line head 18 performs printing on the medium by discharging ink supplied from an ink tank (not illustrated) from the plurality of ink discharge nozzles toward the medium.

The medium on which printing is performed by the printing unit 10 is sent to the post-processing unit 30 via the relay unit 24. The post-processing unit 30 includes an apparatus main body 32, a processing tray 36 and a stapler 34 which is an example of a post-processing section that are provided inside the apparatus main body 32, a discharge unit (not illustrated) that discharges the medium on which post-processing is performed to a main tray 33, and the main tray 33 provided outside the apparatus main body 32.

The medium delivered from the relay unit 24 to the apparatus main body 32 is transported along the transport path TB inside the apparatus main body 32 and sent to the processing tray 36.

The medium is temporarily loaded on the processing tray 36, and is discharged to the main tray 33 by the discharge unit (not illustrated) after necessary post-processing is performed when the post-processing is performed.

Note that the post-processing unit 30 is provided with a rear end alignment unit (not illustrated), and a rear end (a rear end in the +Y direction) of the medium on the processing tray 36 is aligned by the rear end alignment unit. Additionally, a side cursor (not illustrated) is provided at the processing tray 36, and a side end on the processing tray 36 in the width direction (X-axis direction) is aligned by the side cursor. In addition, by the side cursor, it is possible to perform shift discharge processing in which the medium is discharged to the main tray 33 while alternately shifting a position in a width direction. The main tray 33 is movable in the vertical direction, and descends as the medium is loaded.

Figure 2:
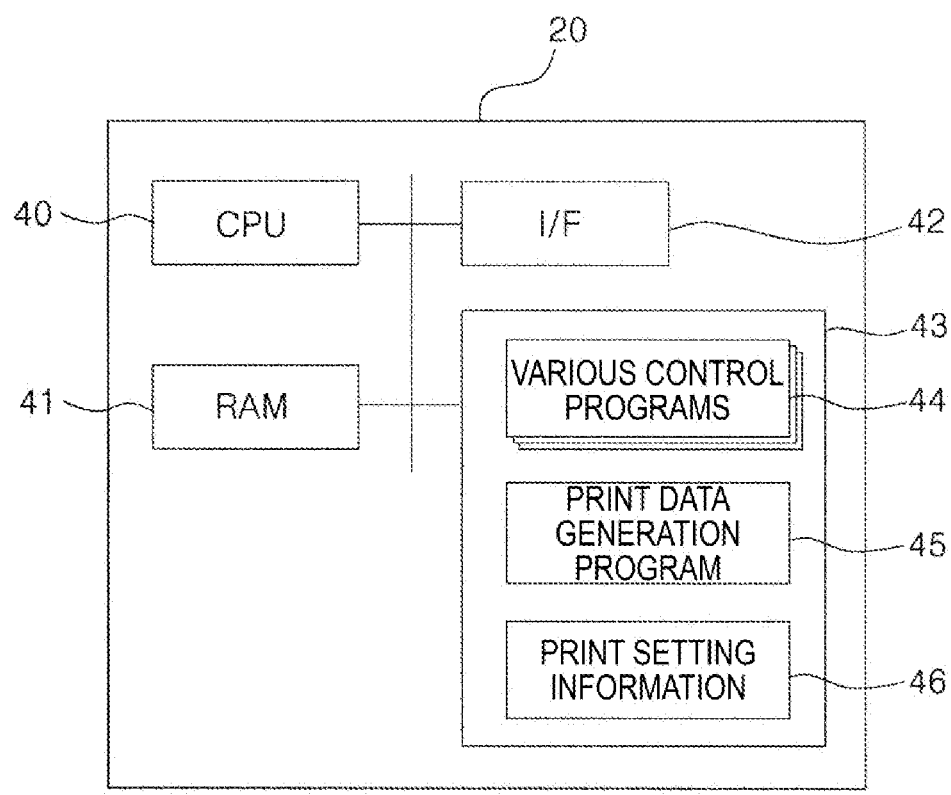
FIG. 2 is a block diagram illustrating a configuration of a printing control unit.

The printing control unit 20 controls the entire printing apparatus 1 including the line head 18 based on a printing condition acquired via the operation panel 2. As illustrated in FIG. 2, the printing control unit 20 includes a CPU 40, a RAM 41, an I/F 42, and a non-volatile memory 43, which is an example of a storage medium.

The CPU 40 loads the various control programs 44 and a print data generation program 45, which will be described later, stored in the non-volatile memory 43 into the RAM 41, which is a volatile memory, and executes the programs. The various control programs 44 include various programs for controlling the printing unit 10 and the post-processing unit 30. Further, the non-volatile memory 43 stores print setting information 46 input and accepted via the operation panel 2. In view of the above functions, the printing control unit 20 can also be referred to as an information processing apparatus or a computer.

Various functions of the printing apparatus 1 are achieved by the CPU 40 executing the various control programs 44. Further, the CPU 40 executes the print data generation program 45 to generate print data for printing performed by the printing unit 10. For example, when the copy function of the printing apparatus 1 is used, the print data is generated based on image data generated by reading a document by the scanner unit 12 and the print setting information 46.

The I/F 42 is a communication interface for coupling the printing apparatus 1 to a local area network (LAN).

Figure 3:
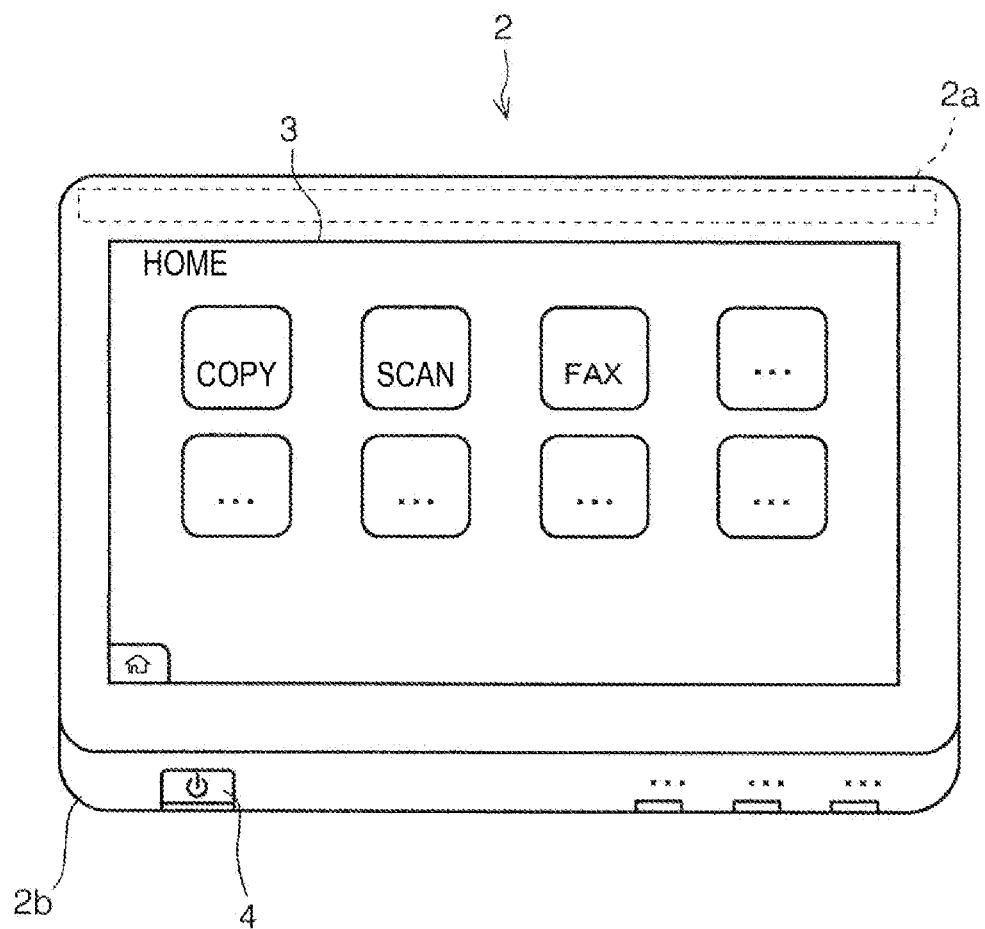
FIG. 3 is a front view of an operation panel.

Next, the operation panel 2 will be described with reference to FIG. 3. The operation panel 2 is an example of an operation unit that includes a touch panel 3 that is a display unit that displays various information, and accepts various operation settings.

The operation panel 2 is provided at the apparatus main body 14 of the printing unit 10 via a rotary shaft 2a, and is provided such that a tilt angle can be adjusted by rotation around the rotary shaft 2a. Further, in the embodiment, the rotary shaft 2a is configured as a free stop hinge such that an optional tilt angle can be held.

A surface of the operation panel 2 is formed of a cover glass, the touch panel 3 is included at a lower layer thereof, and a liquid crystal display unit (not illustrated) is further included at a further lower layer thereof. For the touch panel 3, a capacitance type, a resistance film type, an optical type, an electromagnetic induction type, and the like are known, but in the embodiment, the capacitance type is used. A user's operation on the operation panel 2 is basically a touch operation on the touch panel 3 in the embodiment.

An outer shell of the operation panel 2 is configured by a housing 2b, and a power button 4 for turning on and off power supply of the printing apparatus 1 is arranged below the touch panel 3 in the housing 2b.

A user interface (hereinafter referred to as "UI") is achieved at the touch panel 3 under the control of the printing control unit 20. The various control programs 44 (see FIG. 2) include programs for achieving various UIs. Hereinafter, when processing and operation of the printing apparatus 1 are described based on the various UIs, the above processing and operation are achieved by the printing control unit 20 executing the various control programs 44 and the print data generation program 45 described below. The UI illustrated in FIG. 3 is a home screen on which icons having names such as "COPY", "SCAN", and "FAX" are displayed, and a user touches one of the icons in accordance with an operation to perform.

Figure 4:
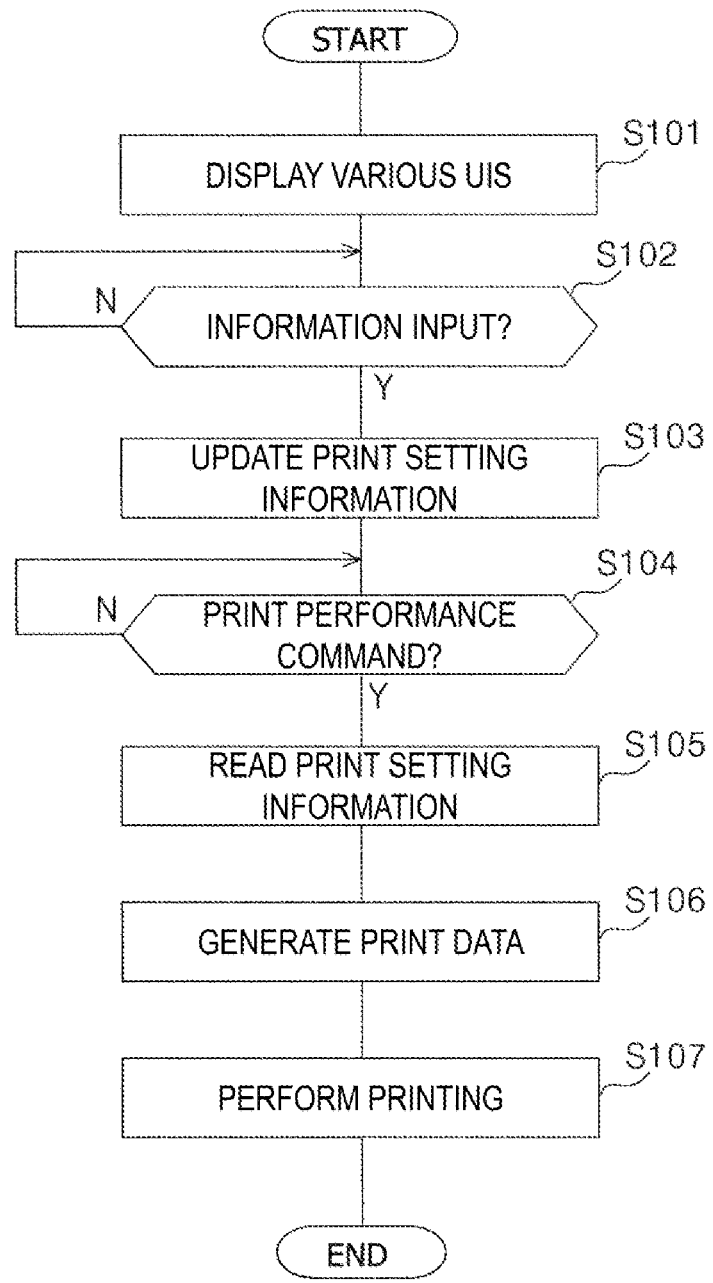
FIG. 4 is a flowchart illustrating a flow of processing performed by the printing control unit.

Next, processing performed by the printing control unit 20 will be schematically described with reference to FIG. 4. The printing control unit 20 displays the various UIs on the touch panel 3 (step S101). When a user inputs information via the various UIs (Yes in step S102), the printing control unit 20 updates the print setting information 46 (step S103). Then, when a print execution command is received (Yes in step S104), the printing control unit 20 reads the print setting information 46 (step S105), generates print data based on the print setting information 46 (step S106), and performs printing (step S107).

Hereinafter, transitioning of the UIs will be described by taking a case where "COPY" is selected on the home screen of FIG. 3 as an example.

Figure 5:
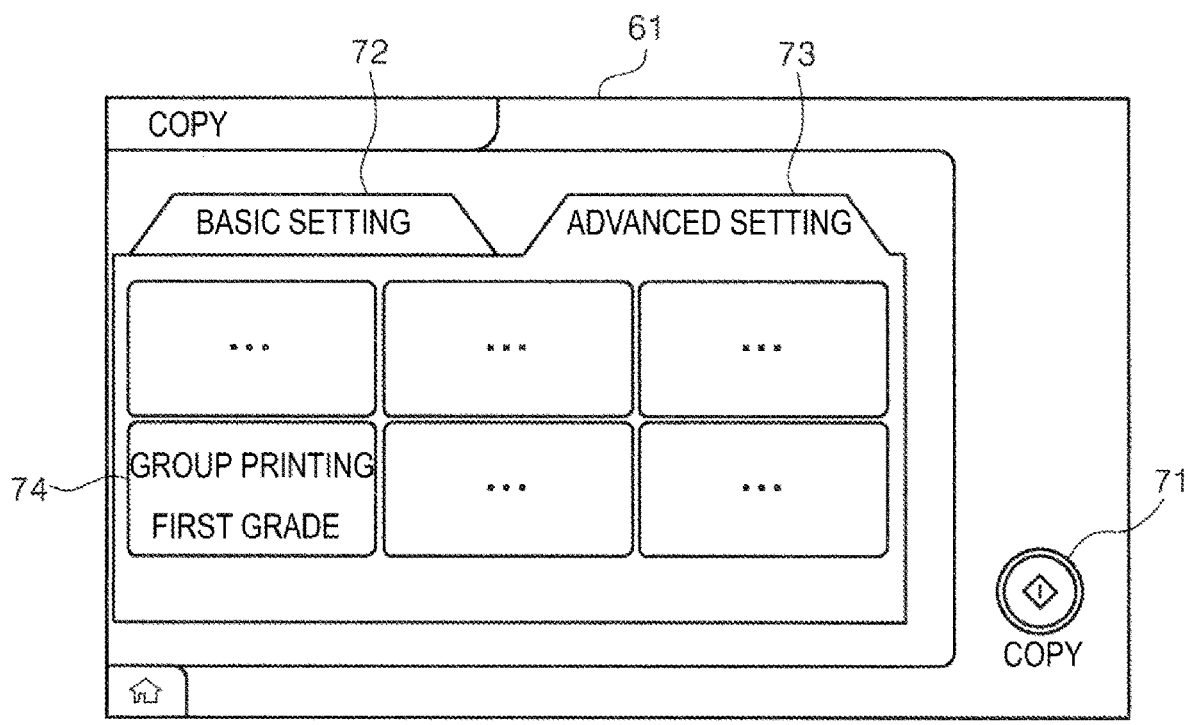
FIG. 5 is a diagram illustrating a UI displayed on a touch panel.

When the copy function is selected, the printing control unit 20 displays a UI 61 including a basic setting tab 72 and an advanced setting tab 73 as illustrated in FIG. 5. The UI 61 displays the basic setting tab 72 by default, but FIG. 5 illustrates a state where the advanced setting tab 73 is selected. Note that although contents of the basic setting tab 72 are not illustrated in the drawing, basic copy settings such as selection of color printing or monochrome printing, setting of print density, paper setting, and print magnification can be made in the basic setting tab 72.

Additionally, a performance button 71 for performing copying, that is, document reading and printing is displayed on a lower right side of the UI 61. Tapping of the performance button 71 corresponds to the print execution command illustrated in step S104 of FIG. 4.

In the advanced setting tab 73, items other than items that can be set in the basic setting tab 72 can be set, and an icon 74 for setting group printing is displayed as an example. Note that although not illustrated in FIG. 5, icons for binding processing using the post-processing unit 30 and saving data read by the scanner unit 12, and the like, are displayed on the advanced setting tab 73.

The icon 74 is an icon for proceeding to setting of group printing, and indicates a name of a currently selected main group among a plurality of main groups to be described later. In the example of FIG. 5, "FIRST GRADE" is displayed as an example of the selected main group.

When the performance button 71 is tapped in this state, group printing is performed with a setting of "FIRST GRADE" described later. Note that when none of the plurality of main groups is selected, "OFF" is displayed instead of "FIRST GRADE", and the function of group printing is turned off.

Figure 6:
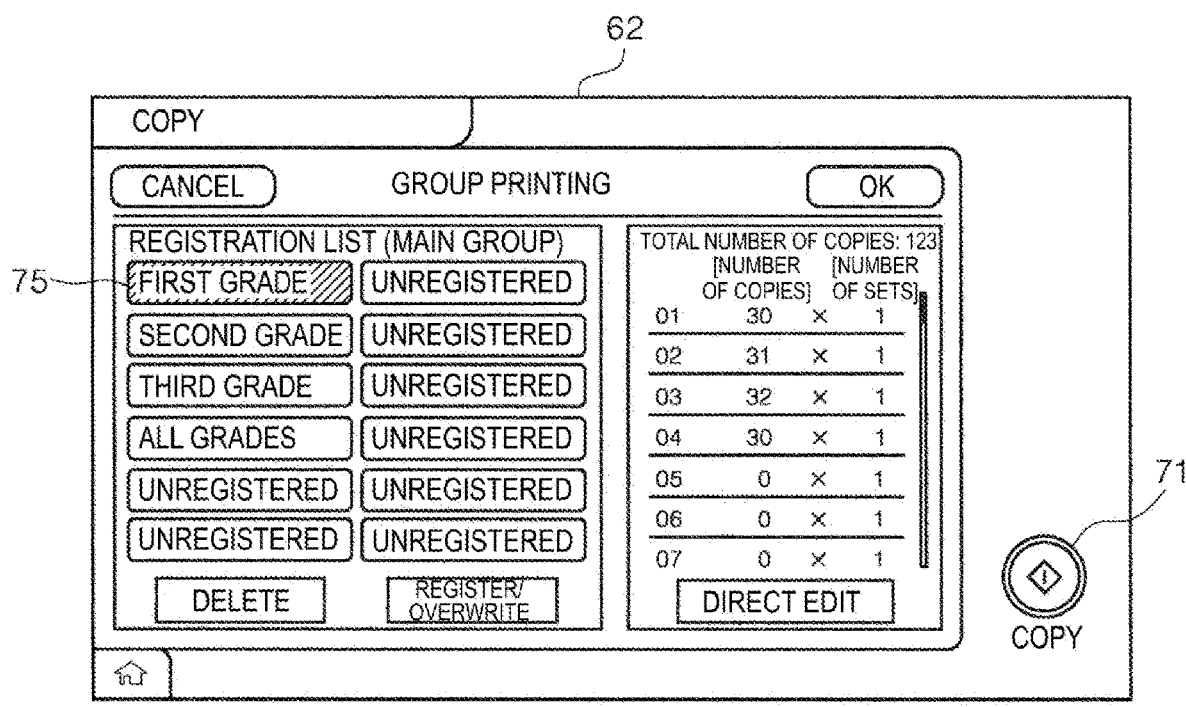
FIG. 6 is a diagram illustrating a UI displayed on the touch panel.

When the icon 74 is tapped, the UI transitions to a UI 62 illustrated in FIG. 6. In the UI 62, a plurality of main groups are displayed in a registration list, and in the example of FIG. 6, four main groups of "FIRST GRADE", "SECOND GRADE", "THIRD GRADE" and "ALL GRADES" are registered. When an icon of each main group is pressed for a long time, the UI transitions to a name input UI (not illustrated), and a name of the main group can be input or changed.

Additionally, when the icon of each main group is tapped for a short time, the icon can be brought into a selected state. Further, when the icon in the selected state is tapped for a short time, the icon can be brought into an unselected state. Only one icon can be brought into the selected state from the plurality of main groups.

In the example of FIG. 6, an icon 75 indicating the main group of "FIRST GRADE" is in the selected state. A color of the icon of each main group changes from light to dark when the icon is brought into the selected state, so that the icon can be distinguished from other unselected icons.

Further, each registered main group can be brought into an "UNREGISTERED" state by tapping a "DELETE" icon. Further, when the "REGISTER/OVERWRITE" icon is tapped in a state where any one of the plurality of main groups is selected, the UI transitions to a UI 63 illustrated in FIG. 7.

Further, when the "DELETE" icon is tapped in a state where any one of the plurality of main groups is selected in FIG. 6, the setting of the selected main group can be deleted and "UNREGISTERED" can be displayed.

Additionally, when an "OK" icon is tapped in FIG. 6, the print setting information 46 (see FIG. 2) is updated with the contents set so far, and the UI returns to the UI 61 in FIG. 5. Additionally, when a "CANCEL" icon is tapped in FIG. 6, the contents set so far are discarded and the print setting information 46 (see FIG. 2) is not updated, and the UI returns to the UI 61 in FIG. 5.

On a right side of the registration list in FIG. 6, the setting contents of the selected main group, specifically, sub-groups to be described later and the number of copies to be printed and the number of sets to be printed associated with each of the sub-groups are displayed. In addition, the total number of copies for the selected main group is displayed. In this state, the number of copies to be printed and the number of sets to be printed are grayed out, and by tapping a "DIRECT EDIT" icon, the number of copies and the number of sets can be directly edited. Note that when the number of copies to be printed is changed here, in the example, the number of copies to be printed of a printed matter for non-colorblind people to be described later increases or decreases, and the number of copies to be printed of a printed matter for colorblind people does not increase or decrease.

The performance button 71 is also displayed in the UI 62 of FIG. 6, and when the performance button 71 is tapped, group printing is performed with the setting of the currently selected "FIRST GRADE".

Figure 7:
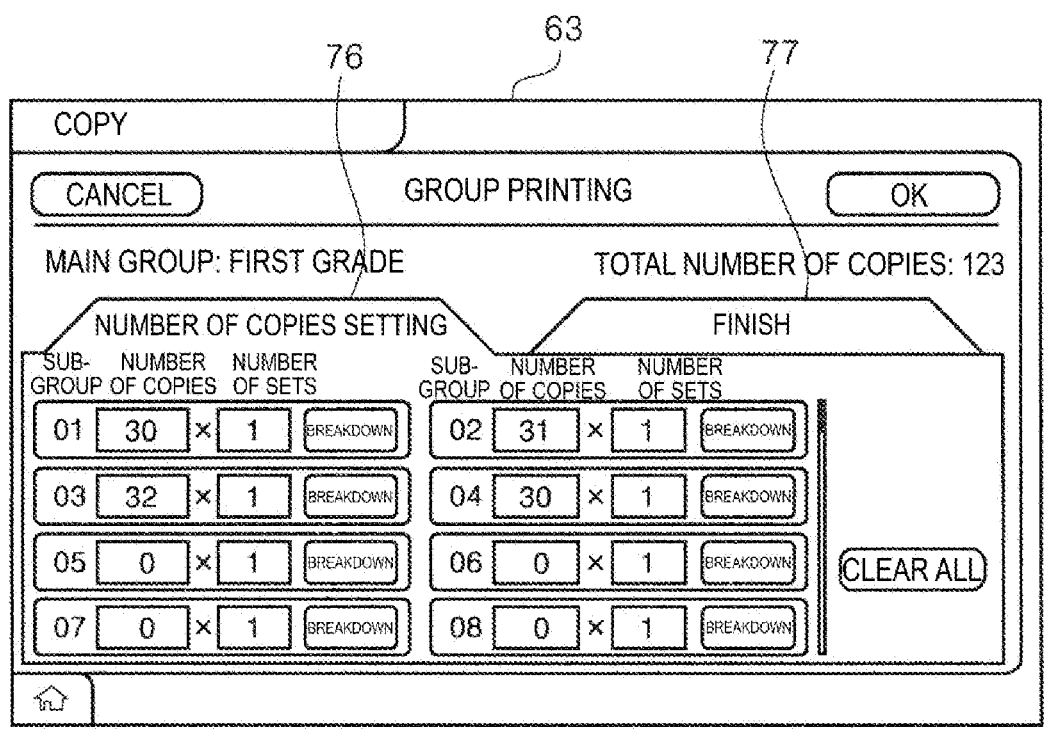
FIG. 7 is a diagram illustrating a UI displayed on the touch panel.

In the UI 63 of FIG. 7, a number-of-copies setting tab 76 and a finish tab 77 are displayed, and the number-of-copies setting tab 76 is displayed by default.

In the number-of-copies setting tab 76, a plurality of sub-groups and the number of copies to be printed and the number of sets to be printed associated with each sub-group are displayed. When a number indicating the number of copies to be printed is tapped, the number indicating the number of copies to be printed is brought into the selected state, and the number of copies to be printed can be set using a numeric keypad (not illustrated). Similarly, when a number indicating the number of sets to be printed is tapped, the number indicating the number of sets to be printed is brought into the selected state, and the number of sets to be printed can be set using the numeric keypad (not illustrated).

Here, the number of copies to be printed and the number of sets to be printed will be described. For example, when the number of sets to be printed is set to "1" for the number of copies to be printed "30", one set of "30" copies is printed. Alternatively, for example, when the number of sets is set to "2" for the number of copies to be printed "30", two sets of 30 copies are printed, that is, 60 copies are printed for the selected sub-group.

In the example of FIG. 7, since there are two sub-groups "01" and "04" for which the number of sets to be printed is "1" for the number of copies to be printed "30", instead of such settings, the number of copies to be printed "0" and the number of sets to be printed "0" may be set for the sub-group "04", and the number of copies to be printed "30" and the number of sets to be printed "2" may be set for the sub-group "01".

However, when the main group is defined as "FIRST GRADE" as in the embodiment, each sub-group is regarded as each class constituting the first grade, which makes it intuitively easy to understand. In addition, in most cases, a configuration of colorblind people to be described later is different for each sub-group, and from this point of view as well, it is suitable in terms of usability that the number of sets to be printed is set to "1" and a breakdown of the number of copies is set for each sub-group.

When the "OK" icon in FIG. 7 is tapped, the set contents are reflected and the UI returns to the UI 62 in FIG. 6. Further, when the "CANCEL" icon in FIG. 7 is tapped, the UI returns to the UI 62 in FIG. 6 without reflecting the set contents.

Figure 8:
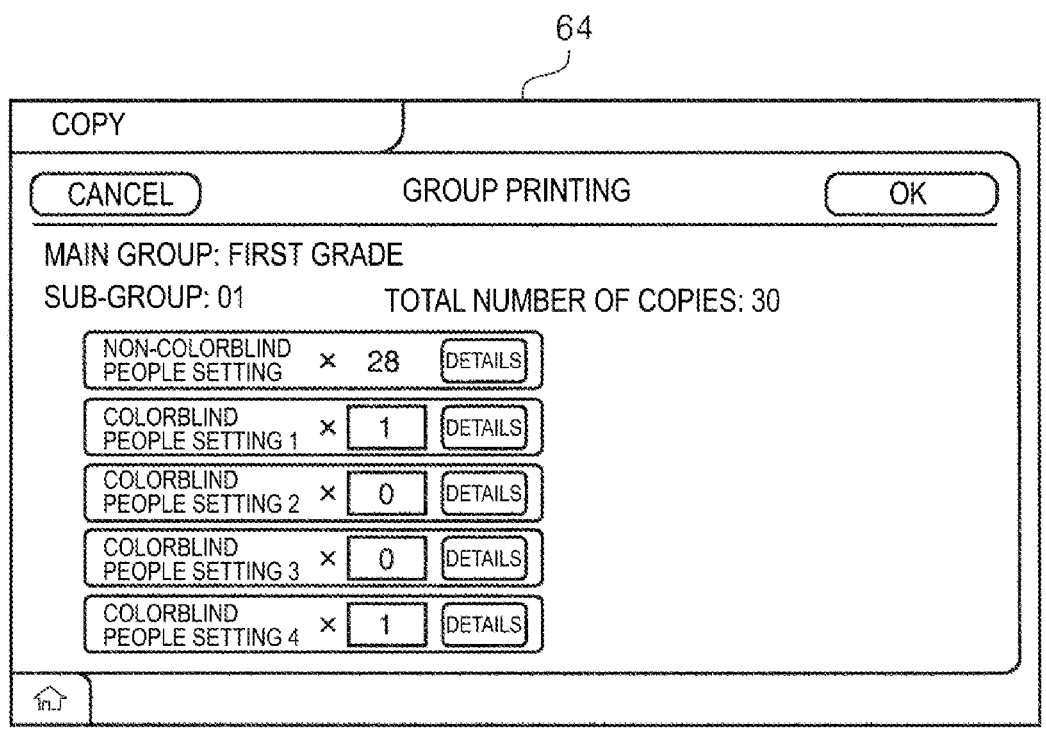
FIG. 8 is a diagram illustrating a UI displayed on the touch panel.

In addition, when a "BREAKDOWN" icon for each sub-group is tapped, the UI transitions to a UI 64 illustrated in FIG. 8. In the UI 64, a main group name currently selected and sub-group names are displayed, and the number of copies of a printed matter for non-colorblind people and the number of copies of a printed matter for each of colorblind people settings 1, 2, 3 and 4 are displayed. When the number of copies of the printed matter for each of the colorblind people settings 1, 2, 3 and 4 is tapped, a number indicating the number of copies is brought into the selected state, and the number of copies can be set using the numeric keypad (not illustrated). Note that as the number of copies for a non-colorblind people setting, a value obtained by subtracting the total number of copies for the colorblind people settings 1, 2, 3 and 4 from the number of copies for the sub-group set in the UI 63 is automatically displayed.

A "DETAIL" icon is displayed on a right side of the number of copies for the non-colorblind people and the number of copies for each of the colorblind people settings 1, 2, 3 and 4, and when the "DETAIL" icon is tapped, the UI transitions to a detailed image quality setting UI (not illustrated), and it is possible to set printing conditions, particularly a color. A printing condition for the non-colorblind people is an example of a first printing condition, and a printed matter according to the first printing condition is the printed matter for the non-colorblind people. Further, a printing condition for the colorblind people is an example of a second printing condition, and a printed matter according to the second printing condition is the printed matter for the colorblind people.

Although the UI for performing the detailed image quality setting of each of the colorblind people settings 1, 2, 3 and 4 is not illustrated, a plurality of types of color settings are preset in advance, and color settings corresponding to color vision characteristics of the colorblind people, for example, P-type, D-type, T-type and A-type can be selected, and a UI is provided for performing further detailed image quality setting. For example, in this UI, it is possible to perform setting for replacing a predetermined color with another color. In this way, the printing control unit 20 accepts the number of copies of the printed matter for colorblind people belonging to one sub-group for each of the different color settings.

The print data generation program 45 includes an image quality conversion table for performing printing according to set image quality, and image quality conversion (image conversion) processing is performed according to the color vision characteristics of the colorblind people. Note that in the detailed image quality setting for the non-colorblind people setting, image quality adjustment such as contrast and sharpness can be performed similarly to a general printer driver.

When the "OK" icon in FIG. 8 is tapped, the set contents are reflected and the UI returns to the UI 63 in FIG. 7. Further, when the "CANCEL" icon in FIG. 8 is tapped, the UI returns to the UI 63 in FIG. 7 without reflecting the set contents.

When the "OK" icon is tapped in the UI 62 illustrated in FIG. 6 as described above, the print setting information set as described above is held by updating the print setting information 46 (see FIG. 2). That is, the printing control unit 20 can accept input of information related to the number of copies of the printed matter for the colorblind people and the number of copies of the printed matter for the non-colorblind people in each of the plurality of sub-groups, and store the information.

When the UI returns from the UI 63 to the UI 62 (see FIG. 6) or further returns to the UI 61 (see FIG. 5) and the performance button 71 is tapped, copying is performed in accordance with the contents set as described above.

At this time, when one main group among the main groups is selected and the print execution command is received, the printing control unit 20 sets the number of copies of the printed matter for the non-colorblind people based on the number of copies of the printed matter for the non-colorblind people set for each of the plurality of sub-groups included in the main group, and then prints the printed matter for the non-colorblind people according to the printing conditions for the non-colorblind people. In the example of FIG. 6, the total number of copies of the number of copies to be printed for the non-colorblind people included in "30 copies" of the sub-group 01, the number of copies to be printed for the non-colorblind people included in "31 copies" of the sub-group 02, the number of copies to be printed for the non-colorblind people included in "32 copies" of the sub-group 03, and the number of copies to be printed for the non-colorblind people included in "30 copies" of the sub-group 04 are printed according to the printing conditions for the non-colorblind people.

Additionally, the printing control unit 20 sets the number of copies of the printed matter for the colorblind people based on the number of copies of the printed matter for the colorblind people set for each of the plurality of sub-groups included in the main group, and then prints the printed matter for the colorblind people according to the printing conditions for the colorblind people. In the example of FIG. 6, the total number of copies of the number of copies to be printed for the colorblind people included in "30 copies" of the sub-group 01, the number of copies to be printed for the colorblind people included in "31 copies" of the sub-group 02, the number of copies to be printed for the colorblind people included in "32 copies" of the sub-group 03, and the number of copies to be printed for the colorblind people included in "30 copies" of the sub-group 04 are printed according to the printing conditions for the colorblind people. Additionally, at this time, the number of printing conditions for the colorblind people is not necessarily one, but may be different.

Figure 10:
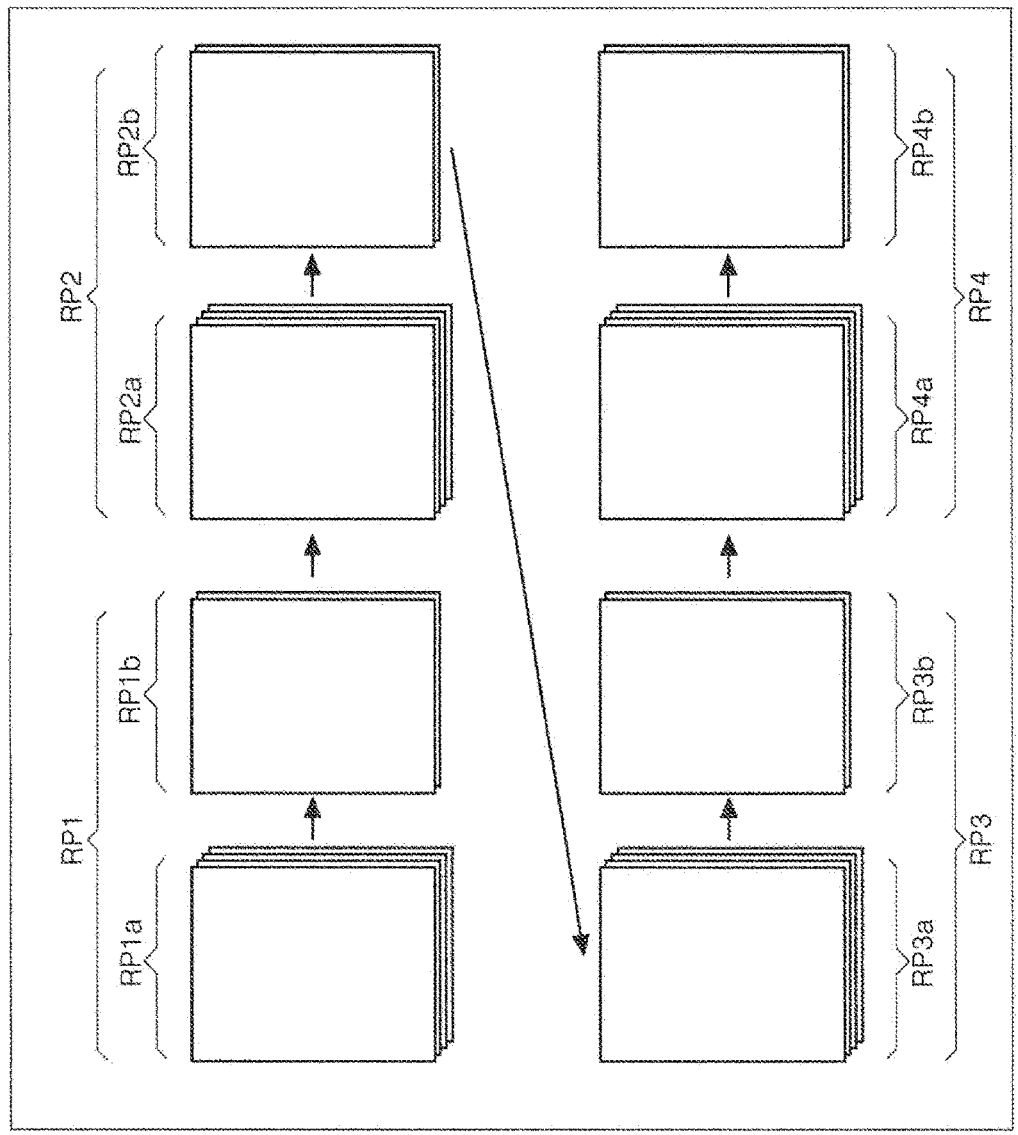
FIG. 10 is a diagram illustrating an example of an output order of printed matters.

In FIG. 10, a reference numeral RP1 denotes a printed matter group belonging to the sub-group 01, and the printed matter group RP1 includes a total of 30 copies of the printed matter according to the UI 62 of FIG. 6. The printed matter group RP1 includes a printed matter group RP1*a* for the non-colorblind people and a printed matter group RP1*b* for the colorblind people. According to the UI 64 of FIG. 8, the printed matter group RP1 includes 28 copies of the printed matter and the printed matter group RP1*b* includes 2 copies of the printed matter.

A reference numeral RP2 denotes a printed matter group belonging to the sub-group 02, and the printed matter group RP2 includes a total of 31 copies of the printed matter according to the UI 62 of FIG. 6. The printed matter group RP2 includes a printed matter group RP2*a* for the non-colorblind people and a printed matter group RP2*b* for the colorblind people.

A reference numeral RP3 denotes a printed matter group belonging to the sub-group 03, and the printed matter group RP3 includes a total of 32 copies of the printed matter according to the UI 62 of FIG. 6. The printed matter group RP3 includes a printed matter group RP3*a* for the non-colorblind people and a printed matter group RP3*b* for the colorblind people.

A reference numeral RP4 denotes a printed matter group belonging to the sub-group 04, and the printed matter group RP4 includes a total of 30 copies of the printed matter according to the UI 62 of FIG. 6. The printed matter group RP4 includes a printed matter group RP4*a* for the non-colorblind people and a printed matter group RP4*b* for the colorblind people.

When the main group "FIRST GRADE" is selected and group printing is performed as described above, the printed matter groups RP1, RP2, RP3 and RP4 are output in this order as illustrated in FIG. 10. In addition, in each of the printed matter groups RP1, RP2, RP3 and RP4, the printed matter group for the non-colorblind people is first output, and then the printed matter group for the colorblind people is output. Arrows in FIG. 10 indicate the output order of the printed matter groups.

Of course, such an output order of the printed matter groups is an example, and the printed matter groups may be output in another order.

Note that, in FIGS. 10 and 11 to 13, for convenience of illustration, each printed matter group is depicted in a shifted manner, but each printed matter group is stacked along the Z-axis direction on the main tray 33 (FIG. 1).

Note that the printing order illustrated in FIG. 10 is not necessarily required to be the same as that illustrated in FIG. 10, as long as the required number of copies of the printed matter for the non-colorblind people are printed, and the required number of copies of the printed matter for the colorblind people are printed.

Figure 9:
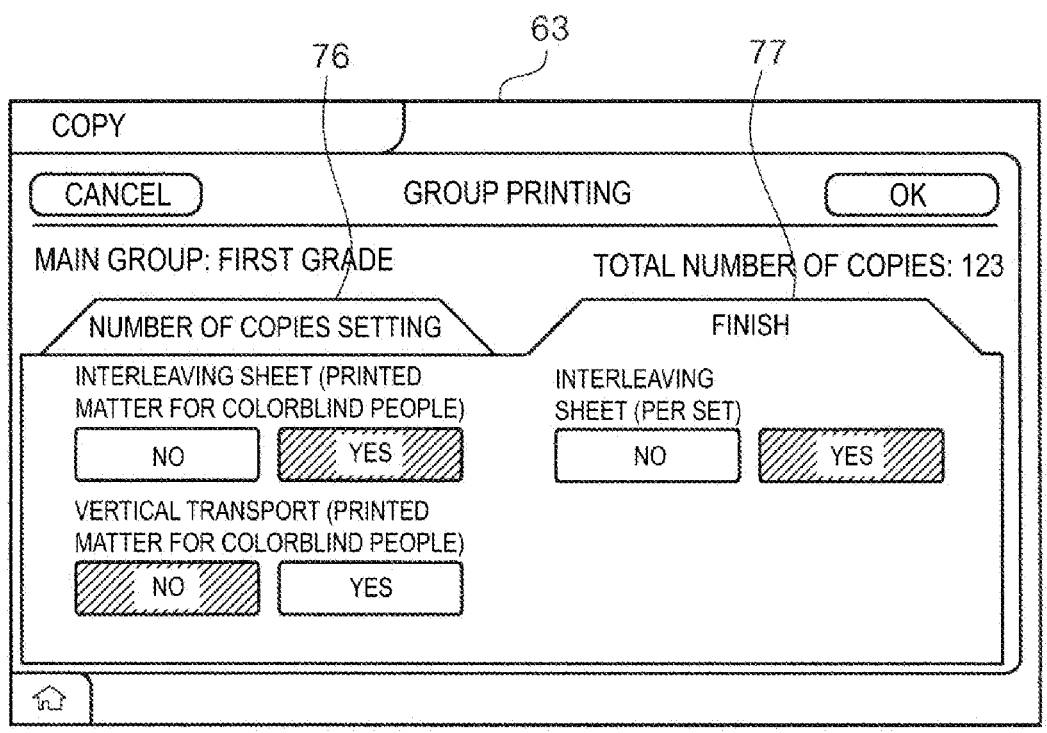
FIG. 9 is a diagram illustrating a UI displayed on the touch panel.

Next, FIG. 9 illustrates a state in which the finish tab 77 is selected in the UI 63.

In the finish tab 77, a "NO" icon for not specifying "INTERLEAVING SHEET (PRINTED MATTER FOR COLORBLIND PEOPLE)" and a "YES" icon for specifying "INTERLEAVING SHEET (PRINTED MATTER FOR COLORBLIND PEOPLE)" are displayed. In addition, the "NO" icon for not specifying "VERTICAL TRANSPORT (PRINTED MATTER FOR COLORBLIND PEOPLE)" and the "YES" icon for specifying "VERTICAL TRANSPORT (PRINTED MATTER FOR COLORBLIND PEOPLE)" are displayed. In addition, the "NO" icon for not specifying "INTERLEAVING SHEET (PER SET)" and the "YES" icon for specifying "INTERLEAVING SHEET (PER SET)" are displayed.

When each of the "NO" icon and the "YES" icon is tapped for a short time, the icon can be brought into the selected state. Further, when the icon in the selected state is tapped for a short time, the icon can be brought into an unselected state. A color of each icon changes from light to dark when the icon is brought into the selected state, so that the icon can be distinguished from unselected icons.

Figure 11:
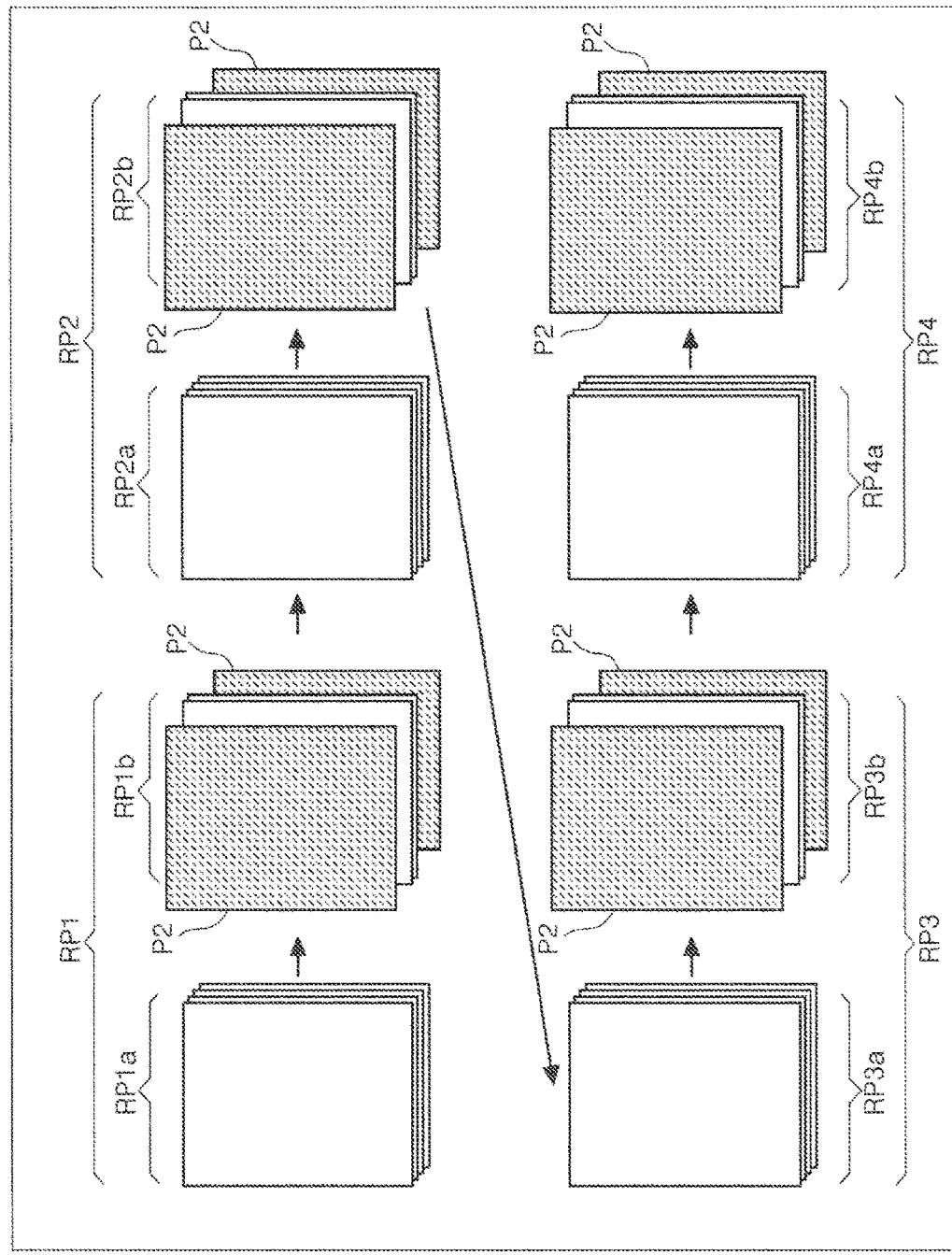
FIG. 11 is a diagram illustrating an example of the output order of the printed matters.

FIG. 11 illustrates an output state of the printed matters when "INTERLEAVING SHEET (PRINTED MATTER FOR COLORBLIND PEOPLE)" is set to "YES". A reference numeral P2 denotes the second medium described above, that is, the interleaving sheet, which is fed from the third media cassette 17C described above. The second medium P2 is sandwiched between the printed matter group for the non-colorblind people and the printed matter group for the colorblind people.

Figure 12:
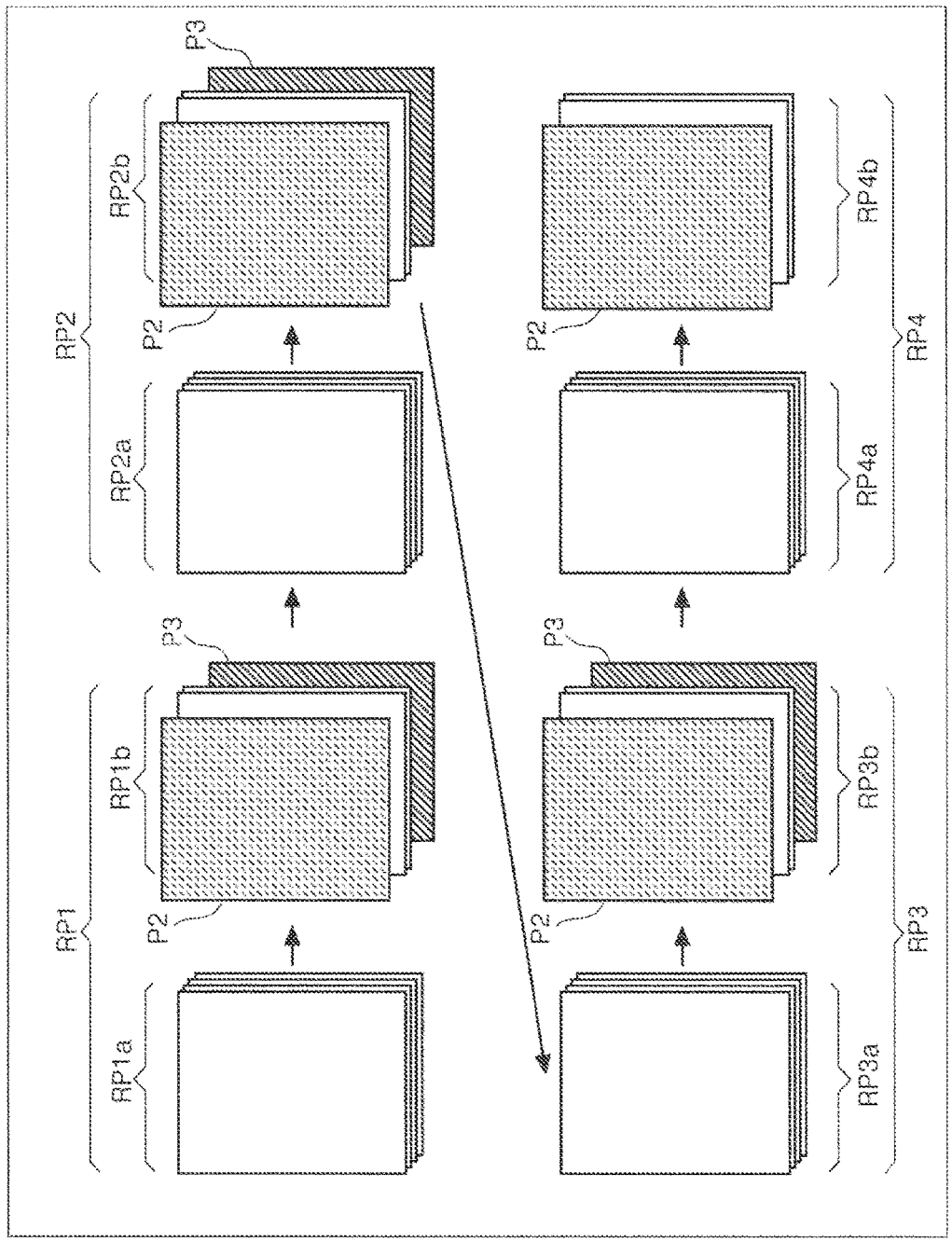
FIG. 12 is a diagram illustrating an example of the output order of the printed matters.

FIG. 12 illustrates an output state of the printed matters when "INTERLEAVING SHEET (PRINTED MATTER FOR COLORBLIND PEOPLE)" is specified as "YES" and "INTERLEAVING SHEET (PER SET)" is specified as "YES". A reference numeral P3 denotes the third medium described above, that is, the interleaving sheet, which is fed from the fourth media cassette 17D described above. The third medium P3 is sandwiched between the printed matter groups of the different sub-groups.

Figure 13:
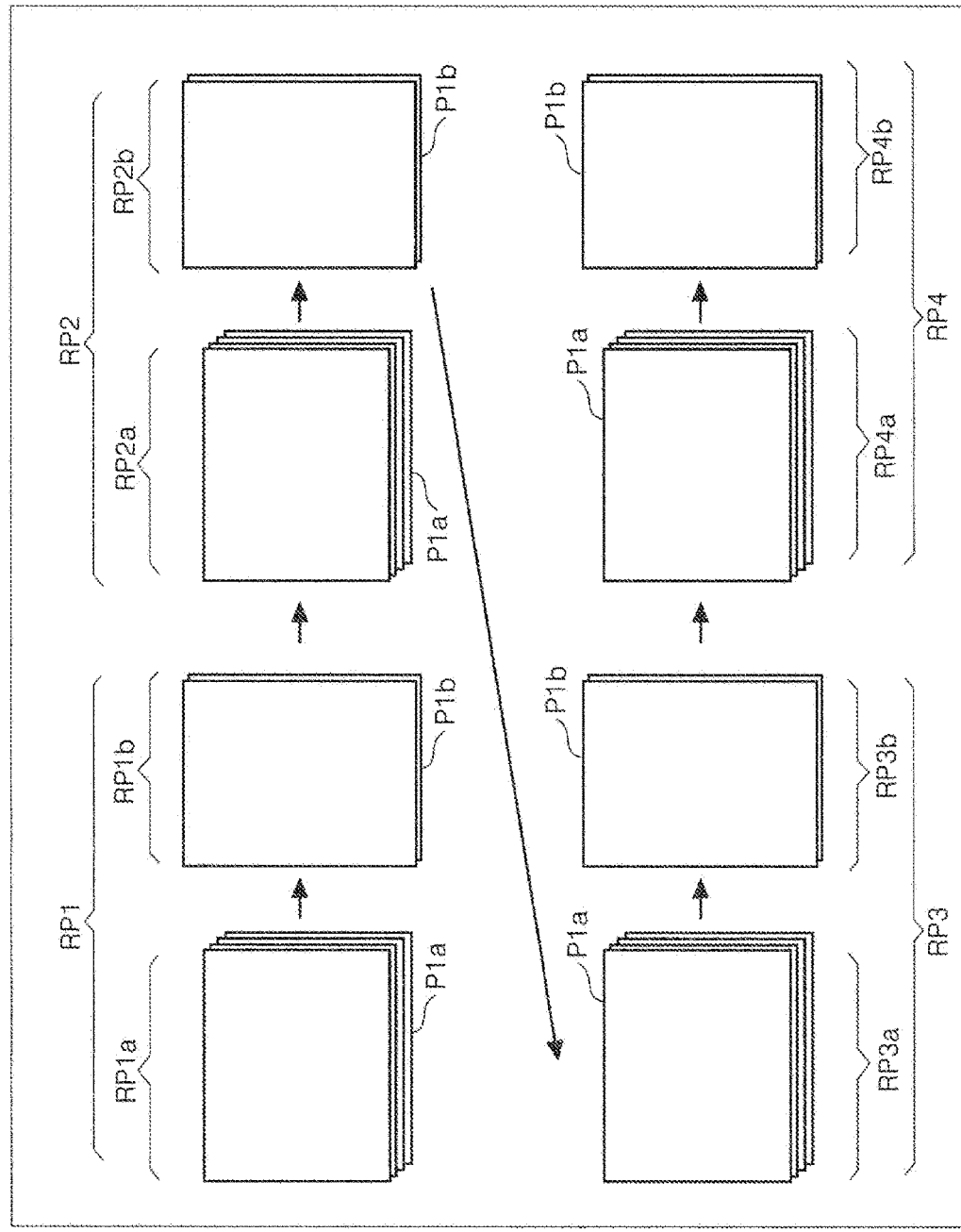
FIG. 13 is a diagram illustrating an example of the output order of the printed matters.

FIG. 13 illustrates an output state of the printed matters when "VERTICAL TRANSPORT (PRINTED MATTER FOR COLORBLIND PEOPLE)" is specified as "YES". The printed matter group for the non-colorblind people is formed by printing on the first medium P1*a* fed from the first media cassette 17A, that is, the medium fed with the short side along the feeding direction, and the printed matter group for the colorblind people is formed by printing on the second medium P2*a* fed from the second media cassette 17B, that is, the medium fed with the long side along the feeding direction.

As described above, the printing control unit 20 of the printing apparatus 1 can display a plurality of main groups and a plurality of sub-groups belonging to one main group on the touch panel 3. Further, the printing control unit 20 can accept input of information related to the number of copies of a printed matter according to a first printing condition and the number of copies of a printed matter according to a second printing condition in each of the plurality of sub-groups, and hold the information. Then, when one main group is selected from the plurality of main groups and a print execution command is received, the printing control unit 20 performs printing based on the first printing condition based on the number of copies of the printed matter according to the first printing condition set for each of the plurality of sub-groups included in the main group, and performs printing based on the second printing condition based on the number of copies of the printed matter according to the second printing condition set for each of the plurality of sub-groups included in the main group. As a result, a user can perform printing without knowing the required number of copies of the printed matter according to the first printing condition and the required number of copies of the printed matter according to the second printing condition in each of the plurality of sub-groups, and usability is significantly improved.

Further, a plurality of sub-groups can be registered for one main group, thus printed matters belonging to the plurality of sub-groups are printed only by specifying the one main group, and the usability is further improved.

Additionally, in the above example, the printed matter according to the first printing condition is the printed matter for the non-colorblind people, the first printing condition includes the color setting for the non-colorblind people, the printed matter according to the second printing condition is the printed matter for the colorblind people, and the second printing condition includes the color setting for the colorblind people.

Accordingly, when one main group is selected and printing is performed, the required number of copies of the printed matter for the non-colorblind people are printed according to the color setting for the non-colorblind people, and the required number of copies of the printed matter for the colorblind people are printed according to the color setting for the colorblind people, thus the user can perform printing even without knowing the number of non-colorblind people and the number of colorblind people in each of the plurality of sub-groups, and the usability is improved dramatically.

Additionally, the printing control unit 20 accepts the number of copies of the printed matter for the colorblind people belonging to one sub-group for each of different color settings, and additionally the printing control unit 20 prints the specified number of copies for each of the different color settings when printing the printed matter for the colorblind people, thus can support a plurality of colorblind people having different color vision characteristics.

In addition, the printing apparatus 1 includes the first media cassette 17A that accommodates the medium (first medium P1*a*) with the short side direction along the feeding direction, and the second media cassette 17B that accommodates the medium (first medium P1*b*) with the long side direction along the feeding direction. Then, the printing control unit 20 can perform the print mode in which the medium is fed from the first media cassette 17A when the printed matter corresponding to the non-colorblind people is printed according to the color setting for the non-colorblind people, and the medium is fed from the second media cassette 17B when the printed matter corresponding to the colorblind people is printed according to the color setting for the colorblind people. Accordingly, since the directions of the short side and the long side of the medium are switched between the printed matter corresponding to the non-colorblind people and the printed matter corresponding to the colorblind people, it is possible to easily distinguish the printed matter for the non-colorblind people and the printed matter for the colorblind people.

In addition, in many cases, since the printed matters corresponding to the non-colorblind people are more than the printed matters corresponding to the colorblind people, and the printed matter corresponding to the non-colorblind people is fed with the short side direction along the feeding direction, it is possible to suppress a printing throughput.

In addition, as described with reference to FIG. 11, the printing control unit 20 can perform the print mode in which the interleaving sheet is interposed between the printed matter for the non-colorblind people and the printed matter for the colorblind people. This improves visibility of where the printed matter for the colorblind people is located is improved. Note that when the plurality of printed matters for the colorblind people are stacked, the interleaving sheet may be inserted for each of the printed matter for the non-colorblind people. Further, in this case, the contents of the color setting may be printed on the interleaving sheet. For example, the color vision characteristics of the colorblind people, as an example, any of P-type, D-type, T-type and A-type may be printed.

In addition, as described with reference to FIG. 12, the printing control unit 20 can perform the print mode in which the interleaving sheet is interposed between the printed matters of the different sub-groups. This improves visibility for the boundary between the printed matters of the different sub-groups.

Note that in the example of FIG. 12, the third medium P3, which is the interleaving sheet, is interposed between the printed matters of the different sub-groups, but may be arranged at a top of the printed matter group RP1, for example, and the main group name and the sub-group name may be printed on each of the third media P3, and in the above example, "FIRST GRADE" may be printed as the main group name, and any of "01", "02", "03" and "04" may be printed as the sub-group name. Thus, it is possible to easily visually recognize which sub-group each printed matter group belongs to.

Further, instead of or in addition to interposing the interleaving sheet or switching the direction of the medium as described above, shift discharge in which a position in a width direction is shifted and the medium is discharged to the main tray 33 may be performed. Specifically, the printed matter group for the non-colorblind people may be discharged at a first position in the width direction, and the printed matter group for the colorblind people may be discharged at a second position different from the first position.

Although the example in which the copy function is performed via the operation panel 2 of the printing apparatus 1 has been described in the above-described embodiment, a function equivalent to that of the above-described print data generation program 45 can also be achieved in a computer 50 (see FIG. 14) that can access the printing apparatus 1.

Figure 14:
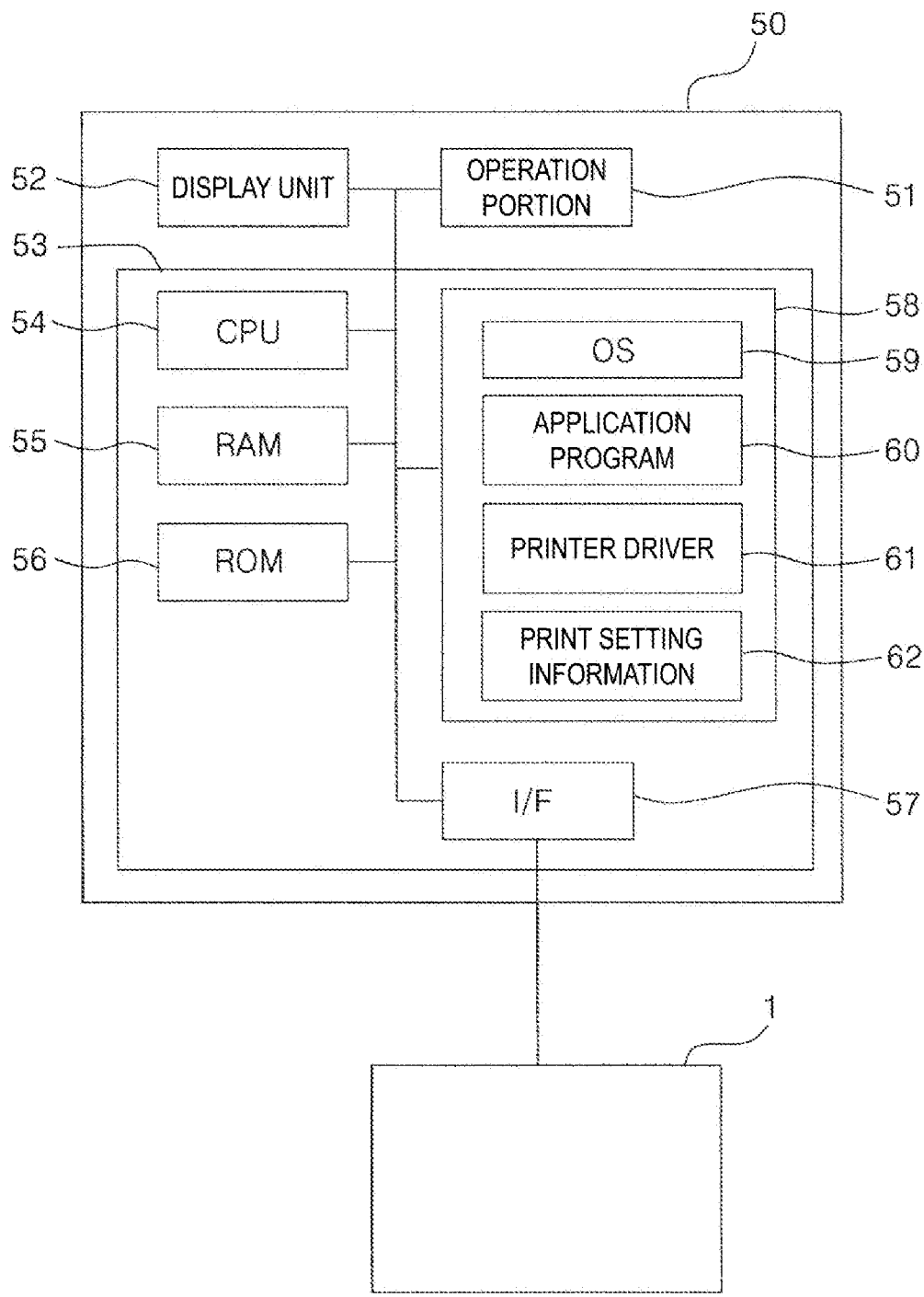
FIG. 14 is a block diagram illustrating a configuration of a computer capable of communicating with the printing apparatus.

In FIG. 14, the computer 50 includes an operation unit 51, a display unit 52, a CPU 54, a RAM 55, a ROM 56, a storage 58 and an I/F 57.

The storage 58 includes a hard disk drive (HDD), a solid state drive (SSD), or the like. The storage 58 stores an operating system (hereinafter referred to as an "OS") 59, an application program 60, a printer driver 61 and print setting information 62.

The CPU 54 loads various programs and the like stored in the ROM 56 and the storage 58 into the RAM 55, which is a volatile memory, and executes the programs.

The operation unit 51 includes a keyboard and a pointing device such as a mouse or a touch pad.

The display unit 52 includes a liquid crystal display or the like. On the display unit 52, various UIs are achieved by the OS 59, the application program 60, the printer driver 61, and the like.

The I/F 57 is a communication interface for coupling the computer 50 to a communication network, for example, a local area network.

The application program 60 is a program that operates under the OS 59, and examples thereof include word processing software or the like. The printer driver 61 is a program for achieving a function equivalent to that of the above-described print data generation program 45, and is an example of the print data generation program. The printer driver 61 generates print data that can be transmitted to the printing apparatus 1 in accordance with data generated by the application program 60 and the print setting information 62.

The UI achieved on the display unit 52 by the printer driver 61 may be equivalent to each UI illustrated in FIGS. 5 to 9. Accordingly, a user of the computer 50 can set the number of copies of a printed matter for colorblind people and the number of copies of a printed matter for non-colorblind people in each of a plurality of sub-groups belonging to one main group. Then, when one main group is selected and printing is performed, the required number of copies of the printed matter for the non-colorblind people are printed according to a color setting for the non-colorblind people, and the required number of copies of the printed matter for the colorblind people are printed according to a color setting for the colorblind people, thus the user can perform printing even without knowing the number of non-colorblind people and the number of colorblind people in each of the plurality of sub-groups, and usability is improved dramatically.

Further, a plurality of sub-groups can be registered for one main group, thus printed matters belonging to the plurality of sub-groups are printed only by specifying the one main group, and the usability is further improved.

It is needless to say that the present disclosure is not limited to each embodiment described above or modification examples, and various modifications are possible within the scope of the present disclosure as described in the appended claims, which also fall within the scope of the present disclosure.

What is claimed is:

1. A printing apparatus including a printing section that performs printing on a medium, comprising:
    an operation unit including a display unit that displays various information and configured to accept various operation settings; and
    a printing control unit configured to control the printing section based on a printing condition acquired via the operation unit, wherein
    the printing control unit is configured to display a plurality of main groups and a plurality of sub-groups belonging to one of the main groups on the display unit,
    the printing control unit is additionally configured to accept input of information related to the number of copies of a printed matter according to a first printing condition and the number of copies of a printed matter according to a second printing condition in each of a plurality of the sub-groups, and store the information, and
    the printing control unit, when receiving a print execution command after one main group is selected from among a plurality of the main groups,
    performs printing based on the first printing condition based on the number of copies of the printed matter according to the first printing condition set for each of a plurality of the sub-groups included in the main group, and
    performs printing based on the second printing condition based on the number of copies of the printed matter according to the second printing condition set for each of a plurality of the sub-groups included in the main group,
    for one print job.

2. The printing apparatus according to claim 1, wherein the printed matter according to the first printing condition is a printed matter for non-colorblind people, and the first printing condition includes a color setting for the non-colorblind people, and
    the printed matter according to the second printing condition is a printed matter for colorblind people, and the second printing condition includes a color setting for the colorblind people.

3. The printing apparatus according to claim 2, wherein the printing control unit accepts the number of copies of the printed matter for the colorblind people belonging to one of the sub-groups for each of the color settings that are different, and
    additionally the printing control unit prints the specified number of copies for each of the color settings that are different when printing the printed matter for the colorblind people.

4. The printing apparatus according to claim 2, comprising:
    a first media cassette configured to accommodate a medium with a short side direction along a feeding direction; and
    a second media cassette configured to accommodate a medium with a long side direction along the feeding direction, wherein
    the printing control unit is configured to perform a print mode in which
    the medium is fed from the first media cassette when the printed matter for the non-colorblind people is printed according to the color setting for the non-colorblind people, and
    the medium is fed from the second media cassette when the printed matter corresponding to the colorblind people is printed according to the color setting for the colorblind people.

5. The printing apparatus according to claim 2, further comprising a media cassette configured to accommodate a first interleaving sheet in addition to a media cassette that accommodates the medium, wherein
    the printing control unit is configured to perform a print mode in which the first interleaving sheet is interposed between the printed matter for the non-colorblind people and the printed matter for the colorblind people.

6. The printing apparatus according to claim 5, further comprising a media cassette configured to accommodate a second interleaving sheet different from the first interleaving sheet, wherein
    the printing control unit is configured to perform a print mode in which the second interleaving sheet is interposed between printed matters of the sub-groups different from each other.

7. A non-transitory computer-readable storage medium storing a print data generation program that generates print data based on an acquired printing condition, the print data generation program being configured to cause a computer to perform:
    displaying a plurality of main groups on a display unit;
    displaying, when one main group is selected from among the plurality of main groups, a plurality of sub-groups belonging to the main group on the display unit;
    accepting input of information related to the number of copies of a printed matter according to a first printing condition and the number of copies of a printed matter according to a second printing condition in each of a plurality of the sub-groups, and storing the information; and
    for one print job, performing printing based on the first printing condition based on the number of copies of the printed matter according to the first printing condition set for each of a plurality of the sub-groups included in the main group, and performing printing based on the second printing condition based on the number of copies of the printed matter according to the second printing condition set for each of a plurality of the sub-groups included in the main group, when a print execution command is received after one main group is selected from among a plurality of the main groups.

* * * * *